DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 416

T901,023

PRODUCTION OF AMMONIUM PHOSPHATE

Horace C. Mann, Jr., 1942 Holiday Drive, Florence, Ala. 35630

Continuation-in-part of application Ser. No. 754,465, Aug. 21, 1968. This application Sept. 23, 1971, Ser. No. 183,268

Int. Cl. C05b *7/00*

U.S. Cl. 71—34

No Drawing. 22 Pages Specification

Production of molten ammonium phosphate melts containing from about 2 to 24 percent of their $P_2O_5$ as polyphosphates without a drying step or a mechanical working step. The melt can be solidified in a variety of granulating apparatus since substantial amounts of mechanical shear type energy are not required when the polyphosphate content of the melt is maintained below about 25 percent, as taught in U.S. Pat. 3,578,433, Bottai et al., May 11, 1971, column 4, line 32 et seq.

Subsequent work indicates that the value of less than about 25 percent of the $P_2O_5$ as polyphosphate requirement to eliminate the necessity of applying mechanical shear energy to the melt after it is formed and before it is cooled and processed to ambient temperatures may vary somewhat over the range of between about 20 and 30 percent. Subsequent work indicates that as long as the range is from about 2 to about 20 percent polyphosphate in the melt the requirement for mechanical working is completely eliminated; that when the melt contains more than 30 percent of the $P_2O_5$ as polyphosphate mechanical working must be utilized; and that when the melt is between about 20 and 30 percent polyphosphate, there is sort of a gray area where some melts, depending on the type and source of acid used in preparing same, will require mechanical working whereas others will not.